Apr. 24, 1923.
J. G. NEWMAN
1,453,228
PROCESS AND APPARATUS FOR MANUFACTURING MATCHES
Filed Nov. 2, 1921 — 4 Sheets-Sheet 2
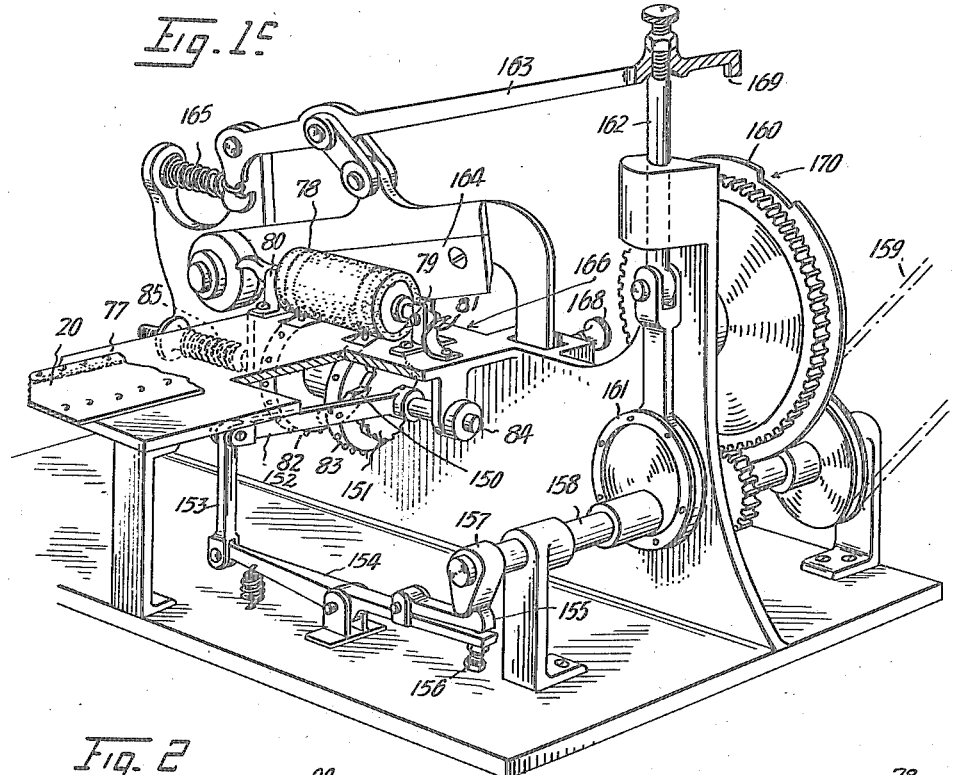
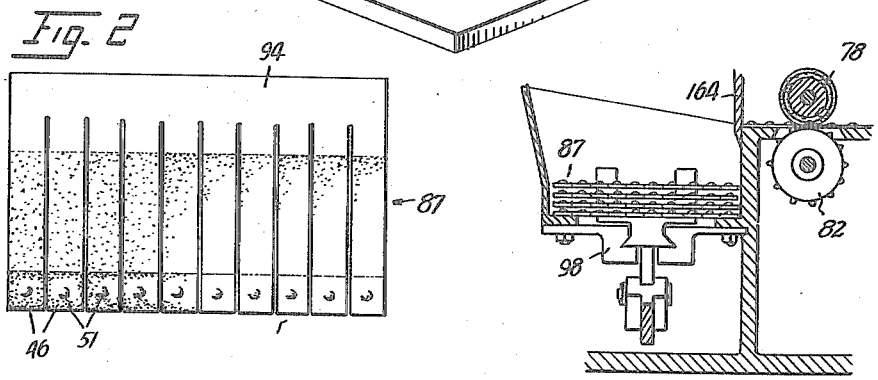
Inventor
J. G. Newman,
By Marks & Clerk
Attys.

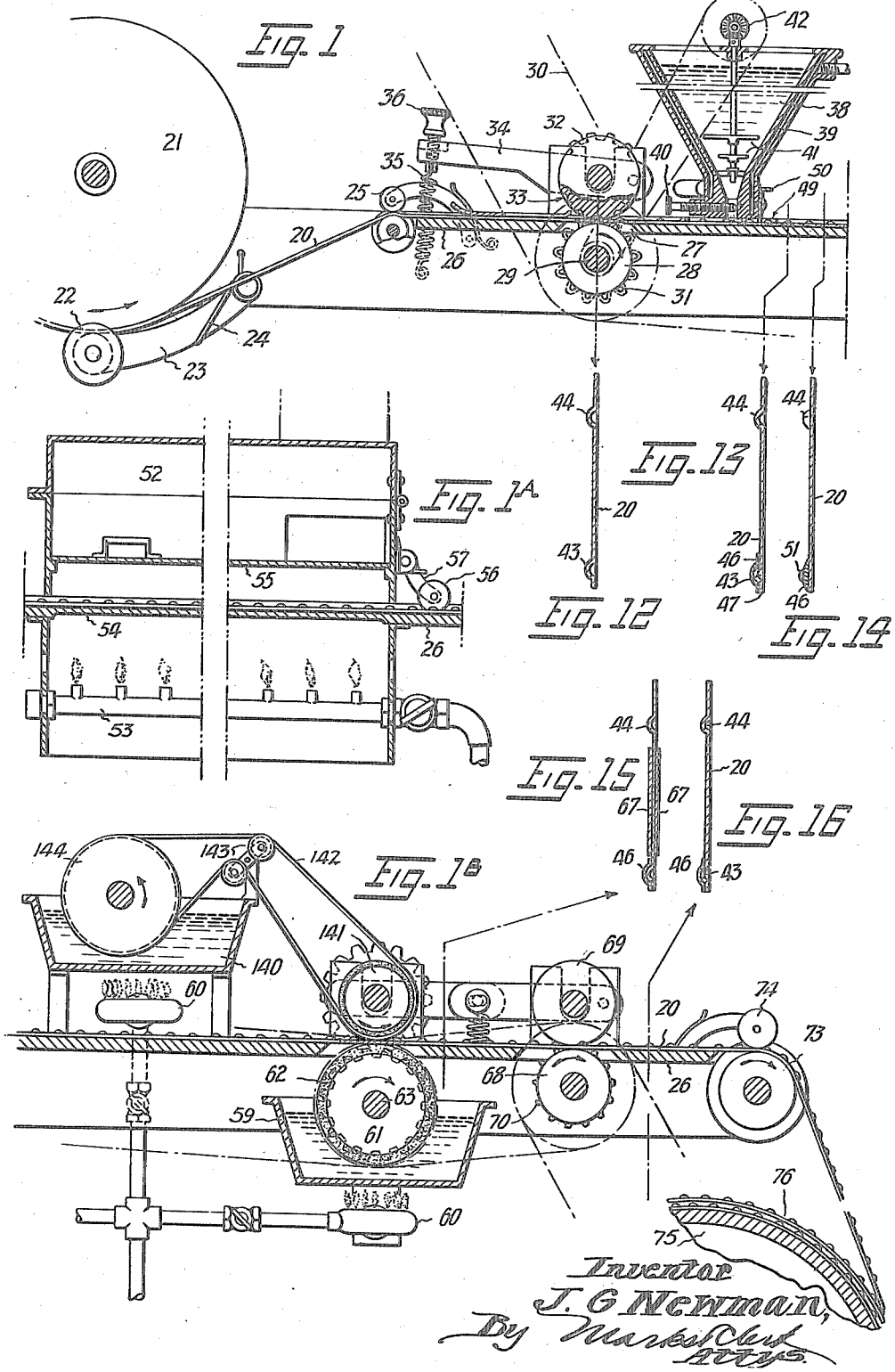

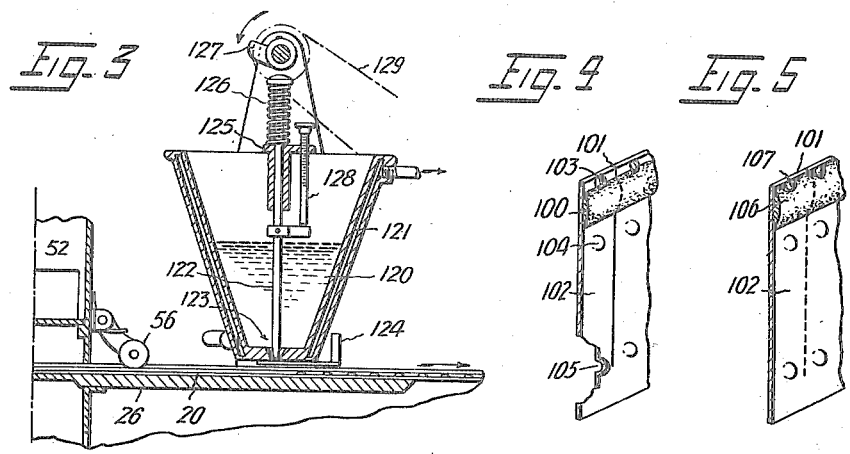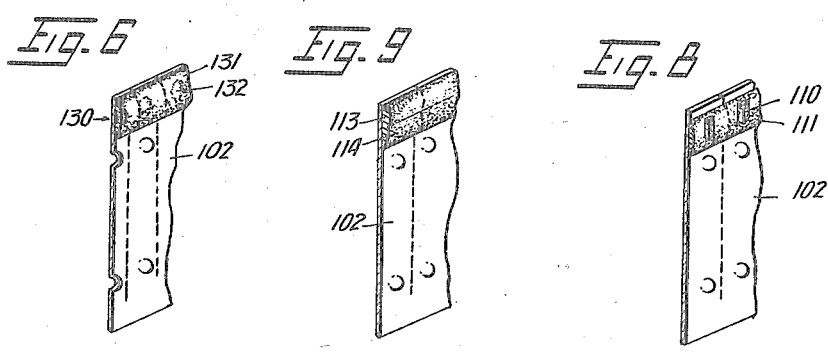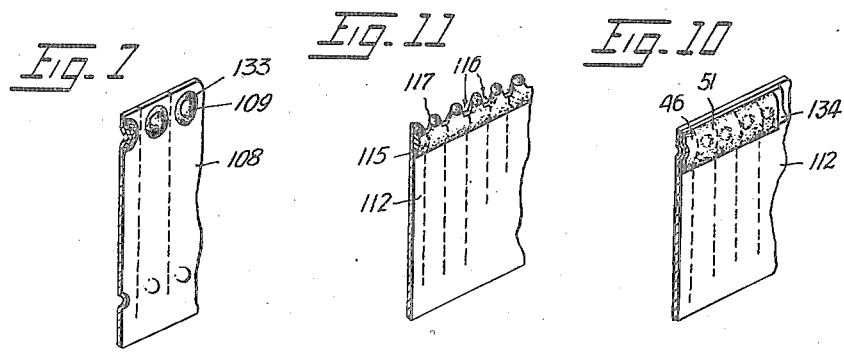

Patented Apr. 24, 1923.

1,453,228

UNITED STATES PATENT OFFICE.

JOHN GLEN NEWMAN, OF NORTH SYDNEY, NEW SOUTH WALES, AUSTRALIA, ASSIGNORS TO JAMES HARDIE AND COMPANY LIMITED, OF SYDNEY, NEW SOUTH WALES, AUSTRALIA.

PROCESS AND APPARATUS FOR MANUFACTURING MATCHES.

Application filed November 2, 1921. Serial No. 512,361.

*To all whom it may concern:*

Be it known that I, JOHN GLEN NEWMAN, subject of the King of Great Britain and Ireland, residing at 40 Jeffrey Street, Milsons Point, North Sydney, New South Wales, Australia, have invented certain new and useful Improvements in Processes and Apparatus for Manufacturing Matches (for which I have filed an application in Australia, No. 18749, dated Nov. 15, 1920), of which the following is a specification.

The present invention relates to apparatus for making matches which are headed with a frictionally ignitible substance and have for their stems or body portions strips of stout paper, thin slivers or veneers of wood, or like strips of other inflammable material. The match bodies are "headed" on one side only, and the heading composition is extended from edge to edge of the strip, and is "crowned" to form a striking place of limited area, and it is also preferably brought up to the top edge of the strip.

The matches are manufactured by applying the heading composition to a continuous ribbon of body material and subsequently slitting this ribbon transversely to form the individual strip matches, leaving an uncut stub to facilitate binding of "cards" of matches in a satchet from which individual matches may be detached as required.

The "crown" is obtained by upwardly embossing the body substance of the match below the "head," or by applying a spot of heading or priming substance upon the head-proper, or by so applying the heading composition that it will have a ridge upon it, or by notching the top edge of the match body and "tipping" the points.

The heading composition used is prepared according to any proved formula—of which many are known—for the heading of "safety" match splints, and similarly the rubber composition is made according to any proved formula for safety match rubbers. The body material of the matches is also "impregnated" with a known solution commonly used in match manufacture for procuring the ember quenching effect when the flame is extinguished, and it is also treated according to existing match making practice with paraffin wax or like greasy material for augmenting its burning quality and proofing it against injury by damp.

In the accompanying drawings, Figs. 1, $1^A$, $1^B$, $1^C$, and $1^D$, read serially and form in effect one figure showing the complete apparatus in longitudinal sectional elevation, the portion shown in Fig. $1^C$ being however shown perspectively to facilitate explanation;

Fig. 2 is a plan view of a slitted "card" of matches ready for binding in a satchet or similarly;

Fig. 3 is a sectional elevation through the machine for "crowning" the match heads by "spotting" them;

Figs. 4 to 11 are perspective sectional elevational views of various forms of matches within the invention; and Figs. 12 to 16 are sectional views of matches during course of manufacture, these figures being related by direction lines to the place respectively where they belong in the machine.

Figure 18:
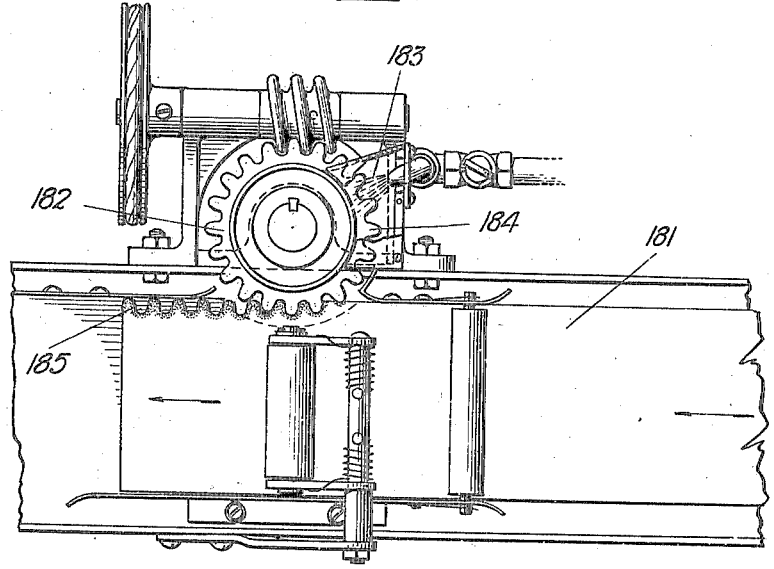
Fig 18 is a plan of an apparatus by which the wood sliver is notched by a hot-toothed wheel.
Figure 19:
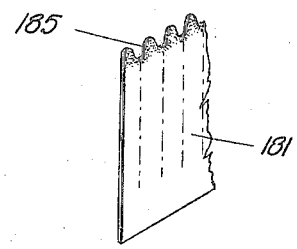
Fig. 19 is a perspective detail of a portion of the notched ribbon.

A stock ribbon of heavy paper or thin wood sliver 20 is wound on a stock reel 21 and said reel is fitted with usual means for braking its rotation so as to maintain the ribbon 20 under slight tension whilst being drawn off the reel. 22 is a rider roller sustained on an arm 23 supported by a spring 24 to hold the uncoiling ribbon 20 up towards the drum so as to prevent loosening of the ribbon in the uncoiling process. The ribbon passes between the carrier and jockey rollers at 25 over a table 26. Below a cavity 27 in this table a pin drum 28 is mounted on an horizontal shaft 29. This drum is driven by a belt diagrammatically indicated by the dotted line 30, said belt being in turn driven by any appropriate motive power.

The direction of rotation of the pin drum 28 is shown by the arrow thereon. Near each end of the roller, pin teeth 31 on its periphery, project above the surface level of the table 26. An embossing roller 32 is mounted above the table 26 parallel with and in vertical relation to the pin drum 28 and spur-geared thereto. On its periphery small pockets 33 are formed to register with the pin teeth 31. The axle of the roller 32 is carried in a riding yoke 34 which is held down by a spring 35, 36 being a screw for regulating the tension of the spring 35. The stock ribbon 20 in passing between the rollers 28 and 32 is embossed near each of its edges; the pin teeth 31 forcing up the material into the pockets 33 in the roller 32 so that when the ribbon 20 has passed said rollers it appears as shown in the latter part of the figure and in Fig. 12 with embossments 43—44 upwardly disposed thereon.

Shortly after passing the embossing rollers 28—32 the strip passes under the hopper 38. This hopper is provided with a steam jacket 39 having suitable steam and exhaust pipe connections thereinto, and at the foot it is provided with a throat valve 40. The valve 40 controls the area of the orifice at the foot of the hopper 38. 41 are stirrers driven by gearing 42 for maintaining the composition mixture uniform in density. The heading composition which is a viscous fluid mixture, is charged into the hopper 38 and maintained in a warm condition by the steam jacket, and as the ribbon 20 passes under the mouth of the hopper below the valve 40, heading composition flows on to the ribbon 20 near one edge of it. This streak of heading composition is contained between two fences, one of which is a ledge on the table bed against which one edge of the ribbon runs, and the other, 49, is located at the other side of the hopper foot and sets close down on the top surface of the ribbon 20. An adjustable sweep gauge or strickler gate 50 is fitted at the front end of the hopper foot; it functions to set the thickness and to determine by its shape the cross section of the streak of heading composition which is deposited on the ribbon 20 from the hopper foot.

A section of the ribbon after it passes under the hopper 38 is shown in Fig. 14, where it will be seen a streak 46 of heading composition is applied immediately over the line of embossments 43, extending from a little below said embossments to the edge 47 of the strip 20, this edge forming the top end of the finished match at the conclusion of the manufacture. The next section (Fig. 15) shows the streak 46 lying flat between the embossments 43 but projecting above the flat level where it over-lies the embossments. 51 is the "crown" of the surfacing which is produced by the spreading of the surfacing composition over the embossments 43.

52 is a drying oven, the temperature of which is maintained by gas fires 53 in a jacket chamber 54 enclosing the drying chamber 55. In the course of the ribbon through the drying chamber 55 the streak of surfacing 46 upon it is dried out and set.

Upon passing out of the oven chamber 55, the ribbon 20 is held down to the table 26 by a jockey roller 56 carried by a spring loaded arm 57. The surfaced strip thence passes through the waxing machine. This machine contains two troughs 59 and 140 in which paraffin wax or other suitable greasy impregnating material is contained. 60 are gas burners set below these troughs to maintain the wax in a warm fluid condition. A roller 61 covered with felt 62 is mounted on a driven spindle 63 and runs in the molten wax in the trough 59. A roller 141 is geared to the roller 61 and is carried on floating bearings so as to bear its weight towards the roller 61. Over the roller 141 passes a continuous cloth or tape belt 142; this belt runs over guide rollers 143, and over a dipper roller 144, which like the roller 61 is mounted for free rotation to work in the molten wax in the trough 140. The belt 142 and the face of the roller 61 grip the paper strip gently but sufficiently tightly to draw it along the table when the rollers are rotated. In passing between the roller 61 and the belt 142 the paper strip is coated with a thin film of wax on both sides of it for the desired width between the two rows of embossments 43, 44, and approaching the embossments 43. The ribbon position is determined by the sprocket drives, the drive applied by the roller 61 and belt 142 being a "slipping" drive. In an exaggerated section the surfaces of waxy material applied to the strip 20 are shown at 67 in Fig. 15. Beyond the trough 59, the strip 20 is drawn along the table 26 by the sprocket rollers 68, the jockey roller 69 which is carried in floating bearings serving to hold the strip 20 in working contact therewith. Two rows of sprockets 70 on the roller 68 engage the embossments 43 and 44 respectively. The headed portion of the strip 20 is not crushed or deformed at any stage in the process the jockey roller being finished to offer the necessary clearance. A regular continuous feed of the ribbon is thus maintained through the machine.

The sprocket roller 68 is timed so that, through it, progressive motion at the same rate as before is applied to the ribbon 20. Fig. 16 shows the section of the ribbon 20 as it appears after passing the rollers 68—69, and it will be observed that at this point the surfacing of waxy material 67 is not shown in the view, for the reason that the waxy material has become absorbed into the body of the paper or wood constituting the ribbon, the absorption being facilitated by the warm condition of the ribbon 20 which it preserves for some time after leaving the drying chamber 55. Finally the ribbon 20 passing between the beam roller 73 and the spring loaded jockey roller 74, above the same, passes on to a stock drum 75, this drum being driven through a lightly slipping clutch which applies drive to it so that the strip 20 is held in very light tension, insufficient to cause any injury to the headed portion of it when the convolutions are wound one over the other as shown at 76. The finished stock ribbon as wound on the stock roller 75 is retained on that roller preferably for several hours for setting or aging purposes, before slitting and packing.

From the stock drum 75 the ribbon 20 comes to the table 77. The ribbon is shown broken short in order to facilitate explanation. From the table 77 the ribbon passes under the rubber faced jockey roller 78. This roller is in floating bearings one of which is pivotally carried in its mounting at 79 whilst the other is carried in a fork guide 80, a spring 81 being provided to prevent accidental vibration of the roller in work. The bearing arrangement described has been devised in order that the roller may be tipped upward to offer access to the strip passing below it to facilitate adjustment and inspection. The faces of two sprocket rollers 82 and 83 project up through slots in the table 77, the sprocket centering and gauge being identical with the toothing on the wheels previously described. The sprocket wheels 82 and 83 are mounted through a friction clutch on a drive spindle 84, 85 being a spring for adjusting the clutch tension. Intermittent rotation is applied to the spindle 84 by a pawl 150 coacting with a detent wheel 151 fixed on it, said pawl being carried on a rock arm 152 which is connected by a link 153 to an oscillating beam 154. On its power end this beam is fitted with a cam striker 155, 156 being a screw adjustment therefor. A cam 157 on the shaft 158 coacts with the striker 155 to apply an oscillation to the beam 154 and consequently a one-tooth advance movement to the sprocket rollers 82—83 for each rotation of the shaft 158. The shaft 158 is driven as by a belt 159, and is geared to a timing disc 160 and carries an eccentric 161 through which a plunger 162 is operated. The plunger 162 acts under an arm 163 which is link geared to a guillotine knife 164, 165 being a pull spring acting to draw said knife down to cut the strip as it passes the back edge 166 of the table 77, and 168 being an adjustable tensioning device by which the guillotine blade is caused to bear with the desired degree of pressure against the table edge to ensure clean cutting of the strip. A check 169 on the arm 163 contacts with the periphery of the timing disc 160 near the bottom of the stroke of the plunger 162, the parts being proportioned so that the guillotine knife movement is thus arrested at part stroke except when the gap 170 is in contact relation, when full stroke is permitted. In the part strokes the strip is slitted with the appropriate numbers of partings and at the full stroke the slitted lengths are cut off, in fives, sixes, sevens or other convenient units as desired, as shown in Fig. 2. The slits do not extend the whole width of the strip, but leave a selvedge 94 to form a binding stub. The embossments 44 may be rolled out in the final steps of the process so as to leave the lower parts of the match stems quite flat as they are shown in Fig. 2. As the waxy or greasy surfaced material permeates the body of the ribbon when absorbed into it so as to extend right up to the tip ends of the matches, it acts to waterproof the heads and thereby protect them against damp, and as the backs of the match strips are thus waxy they are lubricated to a slight extent, and therefore do not cause mechanical injury to the crownings or surfaces of the matches underlying them when they are packed in a satchet.

The embossings 44 may correspond in centering with the crowning embossings 43 or they may be alternated therewith. They serve the double purpose of providing a gripping means for the feed mechanism and for uniforming a slight extension in length along one side and consequent curvature which the strip 20 would suffer if the embossments were applied along one edge of it only on the line 43.

In Fig. 1$^D$ is shown a receiving carrier tray 98 located beyond the end 166 of the table 77 into which the cards 87 containing 10 matches, or any other number, (as shown in Fig. 2) are delivered. The tray 98 is moved intermittently by any suitable mechanism driven in timed relation with the guillotine 164 serves to discharge 7 cards of matches to the packers. Obviously by altering the timing relation any other desired number of "cards" 87, of matches may be delivered in bunches, thus 5, 6, 8, 10 or any other number.

The igniting streak may be applied to the ribbon so as not to extend to the top edge of same and the crowning may be effected by spotting, or the streak may be carried to the top edge of the ribbon.

In Fig. 4 is shown a fragmentary sectional view of a match ribbon in which the heading streak 100 does not extend to the top edge 101 of the ribbon 102. At intervals, spots 103 of heading composition are applied after the streak 100 is set. The ribbon 102 is fed through the apparatus during the process by sprockets engaging in embossments such as 104 and 105 which are formed in the strip during the process of manufacture in the manner already described.

In Fig. 5 is shown a similar view where the streak 106 is carried up to the top edge 101 of the ribbon 102, and the crowning spots 107 are applied upon the streak 106 after drying has taken place.

In Fig. 6 an alternative method of embossing the surfacing to "crown" it is disclosed. In this case the stock ribbon is "spotted" with any material to form nodules 130 at regular intervals. These nodules serve the same purpose as the embossments 43 shown in earlier figures. After this preliminary spotting the stock ribbon is passed through the process of manufacture already described in which heading material is spread in a surfacing streak 131 along one side of it, this material, as explained with reference to Fig. 2, forming protuberances above the nodules 130 to form the crownings 132 on which dependence is placed for ensuring initial ignition in striking. If the spotting material contains a vaporizing or burning substance having deodorant, perfuming, or other qualities, matches so made may be utilized for deodorizing, perfuming, or other such purposes.

In Fig. 7 is shown an arrangement which is not by any means desirable but which is still possible in use. In this arrangement the stem ribbon 108 is embossed in the manner before described, and heading material is applied upon one line of the embossments to form crowns 109 with rimmed portions 133 which do not spread to the side edges of the finished match. This arrangement is objectionable for the reason that whilst striking is facilitated by the crowning, ignition of the stem portion of the match is difficult because the ignited heading material does not extend to the match edges.

In Fig. 8 an arrangement is shown corresponding with the arrangement shown in Fig. 4 except that the spots 103 are in this case shown as prism shaped spots 110 applied over the streak 111 of heading material.

In Fig. 9 the spotting is omitted, but the streak of heading material is applied so as to leave the top edge portion 113 standing up above the general surface 114 of the streak. This ridge 113 forms in effect a continuous edge which is equivalent to an embossed or spotted crowning and serves the like purpose of facilitating the initiation of ignition by frictional contact of the match on the striker rubber. Matches headed in this way are usually only satisfactory in use when struck on the side edge portion; otherwise there is a risk of "flashing".

In Figs. 10 and 11, views are shown of matches made according to this invention from wood slivers. The essential feature is here again the crowning of a surfacing of heading material which is applied to one side only of the match strip. The embossment of wood slivers in the manner already described with reference to Figs. 1 to 1D is not practicable unless the edge of the ribbon of wood is first covered with a strip of paper. This is shown at 134, Fig. 10. This paper strip is applied in a preparatory stage of treatment by any convenient means, the paper being glued to the wood. It is found that when slivers carrying paper reinforcement are submitted to the embossing operation already described the embossments remain much as they do in the case of matches made of heavy paper, and a similar result is obtained, the matches produced corresponding with those illustrated in Fig. 2. In effect, this form of match is identical with the preferred form Fig. 2 except that the strips are wood backed.

An alternative method of producing wood sliver matches may, however, be practiced to procure a match strip 112 ready for cross slitting, as shown in Fig. 11. In this case the top side edge of the wood sliver is first engrailed or notched by passing the ribbon of the wood sliver 181 against a toothed wheel 182 which is heated by a gas flame 183 played upon it to bring it to a red-hot condition so that as the wood ribbon passes the teeth 184 of the wheel char one of its edges forming a notched or engrailed edge 185 the charring effect facilitates ignition of the wood stem when the match is struck. The engrailed edged wood ribbon is now headed with a streak 115 of heading composition in the manner before described. This composition when applied tends to spread upwards on the salient portions of the ends as shown at 116. Finally the tips are spotted by dipping as shown at 117. This spotting does not extend over the back of the match. In all cases it is desirable that the reverse side of the match should be clear of any igniting material. Otherwise there would be a risk of burning the fingers of the user in the striking operation.

After leaving the oven 52, the ribbon 20 passing over the table 26, goes below the hopper 120. This hopper is steam jacketed (121) and is provided with a plunger 122 adapted to reciprocate in the conical throat hole 123 in the bottom of the hopper. 124 is a cut-off plate for closing the exit hole 123. The top end of the plunger 122 is carried in a bearing 125 and is armed with a lift spring 126 to hold it up to the cam 127. 128 is a regulating check which is set to determine the range of movement of the plunger 122. The cam 127 is driven by a belt indicated at 129, and functions to apply reciprocation to the plunger 122 in timing with the feed mechanism, so that the plunger makes a reciprocation for each spotting required. As the plunger reciprocates in the hopper hole 123, it ejects a spot of the heading material and applies same to the ribbon passing below, so that the spot, according to the place of its application, appears as shown in Figs. 4 and 5. By altering the shape of the plunger point and the shape of the hole 123 the shape of the spotting is determined.

What I claim as my invention and desire to secure by Letters Patent is:—

1. Apparatus for manufacturing flexible strip matches, comprising rolls with complementary sprocket teeth and indented teeth, said rolls positioned respectively below and above a table, and means for resiliently bearing said rollers against a continuous stock strip and for rotating them to feed the same and to form embossments therein, a heat jacketed hopper located above said table and adapted to contain match heading composition, a variable vent in the foot of said hopper and stirring means within it, fence and strickle guides below said hopper foot adapted to control the application of a streak of heading composition flowed on the strip from the hopper vent, an oven with heating means adapted for drying the streaked strip, rolls working in contact with said streaked strip after it leaves the oven, means for serving said rolls continuously with hot waxy material, means for drawing said strip from said last-mentioned rolls, and means for slitting it transversely to form individual headed match strips.

2. In apparatus for manufacturing flexible strip matches, means serially disposed for embossing a stock strip at close intervals near one edge of it to form "crowns" thereon, means for applying a streak of liquid heading composition along one side of said strip over the line of said embossments, means for drying said streak, means for applying waxy material to said strip below the streak of heading material thereon, and means for slitting said strip transversely between the embossments thereon to form individual match strips.

3. In apparatus for manufacturing flexible strip matches, means serially disposed for applying a narrow streak of heading composition along one side of a stock strip, means for drying said streak, means for applying spots of heading composition along said streak at close intervals, means for applying hot wax to said strip below said streak, and means for slitting said strip transversely intermediate the spottings to form individual match strips.

4. Apparatus according to claim 3 wherein the spotting device, the drying device, the streaking device, and the waxing device are arranged in the serial order herein stated.

5. In the herein described apparatus for manufacturing flexible strip matches, a heading composition streaking device adapted for applying a ridged streak of heading composition to the stock strip, and an adjustable strickler gate on the front portion of the device for regulating the thickness of the composition deposited by this device.

6. In the manufacture of flexible strip matches, means herein described for surfacing and crowning the strip heads which consists in embossing a stock strip at intervals before it is divided transversely to form matches and feeding the embossed strip with the salient surface upward under a hopper vent fitted with a strickler gate and gauge, from which heading composition is caused to flow onto said strip so as to apply thereto a continuous streak of composition of required thickness covering and surrounding the embossments thereon.

7. In the manufacture of strip matches from a continuous strip of paper or wood-veneer stock, the herein described process of embossing said strip at uniform intervals to form protuberances in a surfacing of heading composition thereafter applied to the same, and utilizing said embossments to be engaged by driver sprockets in feed mechanism, thereby to ensure the registering of said protuberances midway of cutters by which the headed ribbon is transversely slitted to form individual match strips.

8. In the manufacture of flexible strip matches, the process herein described for surfacing and crowning the heads, which consists in embossing a stock strip at intervals before it is divided transversely to form matches and feeding the embossed strip with the salient surface upward under a hopper spout from which heading composition is caused to flow onto said strip so as to apply thereto a continuous streak of said composition to cover and surround the embossments thereon.

9. A process of manufacturing matches which consists in treating a ribbon of paper with ember quenching material, upwardly embossing said paper strip at intervals near one edge thereof, flowing onto one side of said paper a continuous streak of frictionally ignitible material covering the embossments, heating and drying the treated strip, applying melted wax to said strip and slitting it transversely midway between said embossments but so as to leave an unslitted stub binding edge.

10. In the manufacture of flexible strip matches, the process herein described for surfacing and crowning the strip heads which consists in embossing a stock ribbon at intervals before it is divided transversely to form said strips and flowing heading composition onto said ribbon so as to apply thereto a continuous streak of said composition covering and surrounding the embossments thereon.

11. In the manufacture of strip matches from wood veneer the herein described process of tapering the match strip ends which consists in moving the stock ribbon of veneer before heading it, with one of its edges in contact with a hot spur wheel, whereby the strip edge is dentated and charred.

In testimony whereof I affix my signature.

JOHN GLEN NEWMAN.